(12) United States Patent
Raspanti et al.

(10) Patent No.: US 9,944,313 B2
(45) Date of Patent: Apr. 17, 2018

(54) WHEEL UNIT AND STEERING UNIT FOR CONVEYING DEVICES ON WHEELS SUCH AS BEDS, STRETCHERS OR TROLLEYS

(71) Applicants: Luca Raspanti, Imola (IT); Mauro Morotti, Imola (IT)

(72) Inventors: Luca Raspanti, Imola (IT); Mauro Morotti, Imola (IT)

( * ) Notice: Subject to any disclaimer, the term of this patent is extended or adjusted under 35 U.S.C. 154(b) by 0 days.

(21) Appl. No.: 14/913,260

(22) PCT Filed: Feb. 3, 2015

(86) PCT No.: PCT/IB2015/050819
§ 371 (c)(1),
(2) Date: Feb. 19, 2016

(87) PCT Pub. No.: WO2015/118449
PCT Pub. Date: Aug. 13, 2015

(65) Prior Publication Data
US 2016/0194025 A1    Jul. 7, 2016

(30) Foreign Application Priority Data

Feb. 7, 2014   (IT) .............................. BO2014A0056

(51) Int. Cl.
*B62D 5/04*       (2006.01)
*B60B 33/00*      (2006.01)
(Continued)

(52) U.S. Cl.
CPC ........ *B62D 5/0421* (2013.01); *B60B 33/0002* (2013.01); *B60B 33/006* (2013.01);
(Continued)

(58) Field of Classification Search
CPC ............ B60B 33/0002; B60B 33/3306; B60B 33/026; B60B 2200/24; B60B 2200/242;
(Continued)

(56) References Cited

U.S. PATENT DOCUMENTS

| 4,461,367 A * | 7/1984 | Eichinger ............ B60K 7/0007 180/252 |
| 6,491,127 B1 * | 12/2002 | Holmberg ............ B60K 7/0007 180/21 |
| 2007/0080000 A1 | 4/2007 | Tobey et al. |

FOREIGN PATENT DOCUMENTS

WO    WO2009113009 A1    9/2009

OTHER PUBLICATIONS

International Search Report and Written Opinion dated Apr. 2, 2015 from counterpart PCT App PCT/IB2015/050819.

* cited by examiner

*Primary Examiner* — Joseph M Rocca
*Assistant Examiner* — Felicia L. Brittman
(74) *Attorney, Agent, or Firm* — Shuttleworth & Ingersoll, PLC; Timothy J. Klima

(57) ABSTRACT

A steering unit for conveying devices on wheels such as beds, stretchers or trolleys includes a wheel unit and a motor unit. The wheel unit includes a base structure and a wheel mounted on a supporting element to rotate about an axis. The supporting element is mounted on the base structure to rotate about an orientation axis. A transmission includes an inlet unit and outlet shaft. The inlet unit includes an engagement device to reversibly engage the inlet unit on a transmission unit of the motor unit. The outlet shaft is integral with the supporting element and defines the orientation axis. The transmission transforms an inlet motion of the inlet unit into an outlet rotation of the outlet shaft about the orientation axis. A motor includes a complementary engagement device operating with the engagement device for reversibly engaging the inlet unit on the transmission unit.

22 Claims, 8 Drawing Sheets

(51) Int. Cl.
  *B60B 33/02* (2006.01)
  *B62B 3/00* (2006.01)
(52) U.S. Cl.
  CPC ............ *B60B 33/026* (2013.01); *B62B 3/001* (2013.01); *B62D 5/046* (2013.01); *B60B 2200/24* (2013.01); *B60B 2200/242* (2013.01); *B60B 2200/43* (2013.01); *B62B 2301/04* (2013.01)
(58) Field of Classification Search
  CPC .. B60B 2200/43; B62D 5/0421; B62D 5/046; B62B 3/001; B62B 2301/04
  USPC ......................................... 180/252; 5/81.1 R
  See application file for complete search history.

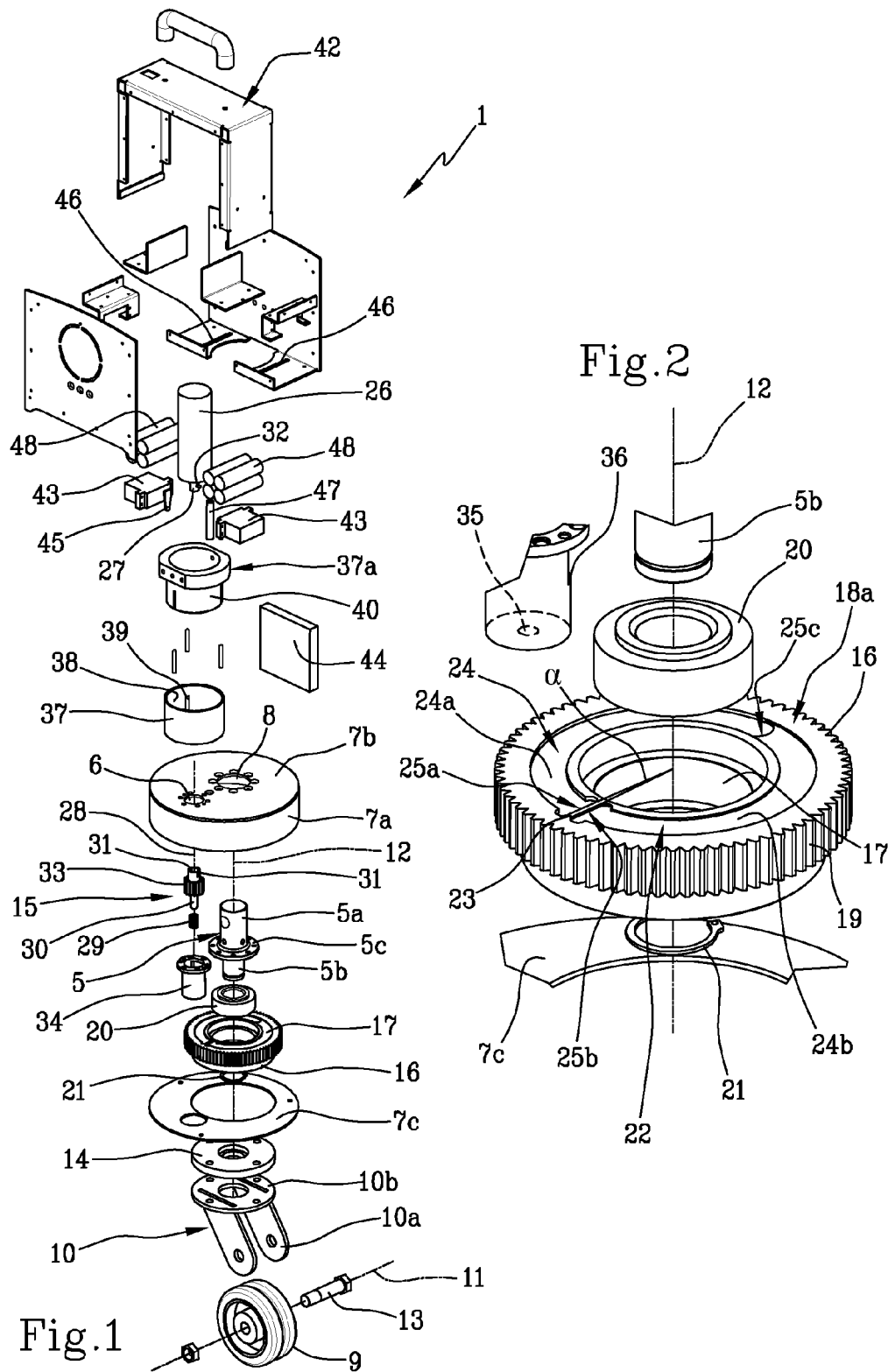

WHEEL UNIT AND STEERING UNIT FOR CONVEYING DEVICES ON WHEELS SUCH AS BEDS, STRETCHERS OR TROLLEYS

This application is the National Phase of International Application PCT/IB2015/050819 filed Feb. 3, 2015 which designated the U.S. and that International Application was published under PCT Article 21(2) in English.

This application claims priority to Italian Patent Application No. BO2014A000056 filed Feb. 7, 2014, which application is incorporated by reference herein.

TECHNICAL FIELD

This invention relates to a wheel unit and a steering unit for conveying devices on wheels such as beds, stretchers or trolleys.

This invention also relates to a motor unit for conveying devices on wheels such as beds, stretchers or trolleys.

Further aspects of this invention relate to a method and a kit for managing a plurality of conveying devices on wheels such as beds, stretchers or trolleys and a method for adapting a plurality of conveying devices on wheels such as beds, stretchers or trolleys already in use.

BACKGROUND ART

The invention refers in particular to beds/stretchers used in the health and hospital sector.

More specifically, beds provided with pivoting wheels are known in that sector. At least one wheel comprises a pedal for braking or releasing the free rotation of the wheel. The same pedal allows the orientation of the wheel to be locked, setting a predetermined direction. This function is used to follow a predetermined trajectory, when an operator must move a bed from one zone to another.

As is known, traditional beds may reach a considerable weight of up to 200-250 kg, considering the mattress and the patient lying on it. Considering that there often only one operator available for moving a bed, it is evident that there can be difficulty both in pushing the bed and maneuvering it along a non-rectilinear route.

Operators often suffer injuries to their backs when moving beds. More specifically, the movements for entering/exiting rooms, alignments when entering lifts and orientation along curved routes, especially in restricted spaces, are problematic.

Systems external to the bed are also known which fix to the bed and/or lift it. These systems are motor-driven, for example by remote control, for allowing easy movement of the bed. These systems are obviously complex, expensive and very bulky so they are not able to completely solve the problems associated with the beds moved manually.

DISCLOSURE OF THE INVENTION

In this context, the technical purpose which forms the basis of this invention is to propose a wheel unit and a steering unit that overcomes the above mentioned drawbacks of the prior art.

More specifically, the aim of this invention is to provide a wheel unit and a steering unit which facilitate that the movement of conveying devices on wheels such as beds, stretchers or trolleys in particular in curves and restricted spaces.

A further aim of this invention is to provide a wheel unit and a steering unit which require little maintenance and have limited production costs so as to be also used, for example, to adapt conveying devices already in use.

The technical purpose indicated and the aims specified are substantially achieved by a wheel unit, a steering unit, a motor unit, a kit and a management method and a method for adapting a plurality of conveying devices on wheels such as beds, stretchers or trolleys already in use comprising technical features described herein. Different embodiments are also disclosed herein.

More specifically, according to a first aspect of it, this invention relates to a wheel unit for conveying devices on wheels such as beds, stretchers or trolleys comprising:

a base structure designed to be mounted on a conveying device on wheels and a wheel mounted on a supporting element in such a way as to rotate about a relative axis of rotation, wherein the supporting element is mounted on the base structure in such a way as to rotate about an orientation axis positioned transversely to the axis of rotation of the wheel to allow the orientation of the wheel and its axis of rotation about the orientation axis, characterised in that it comprises transmission means comprising at least an inlet unit and an outlet shaft, wherein the inlet unit comprises engagement means designed to reversibly engage the inlet unit on a transmission unit of a motor unit, wherein the outlet shaft is integral with the supporting element and defines the orientation axis, and wherein the transmission means are configured for transforming an inlet motion of the inlet unit into an outlet rotation of the outlet shaft about the orientation axis.

According to a further aspect, this invention relates to a steering unit for conveying devices on wheels such as beds, stretchers or trolleys comprising a wheel unit and a motor unit comprising a motor equipped with a transmission unit comprising complementary engagement means designed to operate in conjunction with engagement means of the inlet unit for reversibly engaging the inlet unit on the transmission unit.

In general, the wheel unit and the steering unit according to this invention allow the motorisation of the wheel orientation. Moreover, the mounting is fast in any hospital bed, operating bed or stretcher, in a hospital or the like. An excellent maneuverability is therefore achieved, allowing a single initial force during pushing at the start and then making the movement very smooth and easy. More specifically, when moving along a curved route the effort required is reduced to approximately 50%.

The bed may be rotated by 360° about the orientation axis without injuring the back of the operator.

In addition to the easier movement, there is a reduction in the time required for moving the patient, a reduction in injuries and a reduction in costs.

According to a yet further aspect, this invention relates to motor unit for the wheel unit of conveying devices on wheels such as beds, stretchers or trolleys comprising a portable containment box and a motor positioned inside the box and equipped with a transmission unit comprising complementary engagement means designed to operate in conjunction with the engagement means of the inlet unit for reversibly engaging the inlet unit on the transmission unit, wherein the motor unit is designed to be mounted on the base structure using fast and reversible coupling means.

According to a yet further aspect, this invention relates to a kit for managing a plurality of conveying devices on wheels such as beds, stretchers or trolleys comprising a plurality of wheel units and a single motor unit which can be coupled in a fast and reversible fashion to each wheel unit.

According to a yet further aspect, this invention relates to method for managing a plurality of conveying devices on wheels such as beds, stretchers or trolleys comprising:

preparing a plurality of wheel units and a single motor unit, mounting at least one wheel unit for each conveying device, coupling the motor unit in a fast and reversible fashion selectively to each wheel unit according to the conveying device to be used.

According to a yet further aspect, this invention relates to a method for adapting a plurality of conveying devices on wheels such as beds, stretchers or trolleys wherein each conveying device comprises plurality of pivoting wheels, the method comprising:

preparing a plurality of wheel units or a plurality of steering units, replacing at least one pivoting wheel of each conveying device with a wheel unit or a steering unit.

According to one or more of the above-mentioned aspects, this invention may comprise one or more of the following features.

Preferably, the inlet unit is movable between an engaged position, designed to allow the inlet unit to engage on the transmission unit of the motor unit, and an idle position.

Preferably, the inlet unit comprises an inlet shaft mounted in a rotary fashion on the supporting structure about a respective inlet axis, preferably parallel to the orientation axis.

Preferably, the inlet shaft is movable along the respective inlet axis between an engaged position, designed to allow the inlet shaft to engage on the transmission unit of the motor unit, and an idle position.

Preferably, there are pushing means acting on the inlet shaft to hold it in the engaged position, the pushing means being preferably elastic means.

Preferably, the inlet shaft comprises at least one axial groove having at least one open end designed to receive transversal pins for coupling the transmission unit of the motor unit, preferably a transmission shaft of the motor unit.

Preferably, there are disengagement means operatively associated with the inlet shaft to move it from the engaged position to the idle position and keep it in the idle position. In this way, a passage from freewheel to controlled wheel (connected to the motor) is obtained and vice versa. This function allows the operator to quickly and easily change from freewheel to controlled wheel (connected), simply by activating the disengagement means.

Preferably, the disengagement means comprise an auxiliary motor having a transmission unit operatively connected with the inlet shaft and/or a cam device, preferably operated manually, operatively connected to the inlet shaft.

Preferably, the inlet shaft comprises a pinion meshing with a crown of the outlet shaft.

Preferably, there is a disk-shaped element integral with the outlet shaft and having a surface transversal to the orientation axis comprising an annular reference zone, the axis of which coincides with the orientation axis, and wherein the annular reference zone comprises at least a first sector and a second sector located at different heights relative to each other, the heights being measured parallel to the orientation axis.

Preferably, the first sector has an angular extension relative to the orientation axis less than the angular extension of the second sector, the angular extension of the first axis being preferably designed to define a predetermined angular position of the wheel and of its axis of rotation relative to the orientation axis.

Preferably, the first sector comprises a rib radial relative to the orientation axis which rises from the transversal surface (that is to say, from the annular reference zone) of the disk-shaped element.

Preferably, the second sector comprises at least two sub-sectors located at different heights relative to each other and relative to the first sector, the heights being measured parallel to the orientation axis, and wherein preferably the sub-sectors have an equal angular extension.

Preferably, the disk-shaped element is the crown of the outlet shaft.

Preferably, the base structure comprises a pin which is designed to be inserted in a seat of a frame of the conveying device on wheels.

Preferably, the pin is coaxial with the outlet shaft.

Preferably, the outlet shaft is mounted on the pin in such a way as to rotate about the orientation axis.

Preferably, the pin comprises a first axial portion designed to be inserted in a seat of a frame of the conveying device on wheels and a second axial portion and wherein the outlet shaft is hollow and inserted axially on the second axial portion of the pin in such a way as to rotate about the orientation axis.

Preferably, the base structure comprises an outer case enclosing at least partly the transmission means, the case having at least one access opening designed to receive the transmission unit of the motor unit.

Preferably, the base structure comprises a receiving element defining a receiving seat designed to receive at least a portion of the motor unit.

Preferably, the receiving seat comprises guide and centring elements, for example a plurality of ribs, designed to operate in conjunction with corresponding guide and centring elements, for example a plurality of grooves, of the motor unit.

Preferably, the receiving element has an access opening designed to receive the transmission unit of the motor unit, the access opening of the receiving unit being positioned at the access opening of the outer case of the base structure.

Preferably, the motor unit is mounted on the base structure by fixing means configured in such a way as to define at least a single position at least of the motor, preferably of the motor unit, relative to the base structure in an operating configuration of the steering unit.

Preferably, there is a control unit operatively connected to the disengagement means, for example to an auxiliary motor having a transmission unit operatively connected to the inlet shaft, the control unit being programmed for operating the disengagement means following a command selected by an operator.

Preferably, the motor unit is mounted on the base structure by coupling means configured in such a way as to define at least a first and second position at least of the motor, preferably of the motor unit, relative to the base structure in an operating configuration of the steering unit.

Preferably, the coupling means comprise a receiving element associated with the base structure and defining a receiving seat designed to receive at least one portion of the motor unit, for example a centring bushing, in at least the first and second position relative to the base structure.

Preferably, the receiving seat comprises guide and centring elements, for example a plurality of ribs, designed to operate in conjunction with corresponding guide and centring elements, for example a plurality of grooves, of the motor unit, for example of a centring bushing.

Preferably, the receiving element has an access opening designed to receive the transmission unit of the motor unit, the access opening of the receiving unit being positioned at the access opening of an outer case of the base structure.

Preferably, there are motor means designed for moving the motor at least between the first and second position relative to the base structure in a configuration of use of the steering unit and a control unit operatively connected to the motor means and programmed for operating the motor means following a command selected by an operator.

Preferably, the motor means are operatively interposed between a box for containing the motor unit and the base structure for moving the containment box at least between the first and second position.

Preferably, the motor means are operatively interposed between the motor and a box for containing the motor unit or the base structure for moving the motor at least between the first and second position.

Preferably, there is a control unit operatively connected to the motor and to a remote control, the control unit being programmed for operating the motor following a command selected by an operator and orienting the wheel relative to the orientation axis.

Preferably, there is a position sensor facing the annular reference zone and configured for measuring the height, the position sensor being operatively connected to the control unit for measuring the angular orientation (preferably in a separate manner, that is to say, a right-hand angular orientation, a left-hand angular orientation and a zero angular orientation) of the wheel relative to the orientation axis as a function of the height measured by the position sensor.

It should also be noted that, according to another aspect, the position sensor is operatively connected to the control unit for measuring a coupling condition of the motor with the wheel, that is to say, a condition wherein the motor is connected by a kinematic mechanism with the wheel for controlling it.

Preferably, the control unit is programmed for measuring the angular orientation of the wheel relative to the orientation axis as a function of the height measured by the position sensor and controlling the motor to achieve a predetermined orientation of the wheel, for example associated with the first sector of the annular reference zone, preferably moving along the smaller angle.

Preferably, the motor unit comprises a portable containment box containing the motor and wherein the motor unit is mounted on the base structure using fast and reversible coupling means.

BRIEF DESCRIPTION OF DRAWINGS

Further features and advantages of this invention are more apparent from the non-limiting description which follows of a preferred, non-limiting embodiment of a steering unit as illustrated in the accompanying drawings, in which:

FIG. 1 is a schematic perspective view of separate parts of a steering unit according to a possible embodiment of this invention;

FIG. 2 is an enlarged schematic view of the detail A of FIG. 1;

DETAILED DESCRIPTION OF PREFERRED EMBODIMENTS OF THE INVENTION

Figure 3:
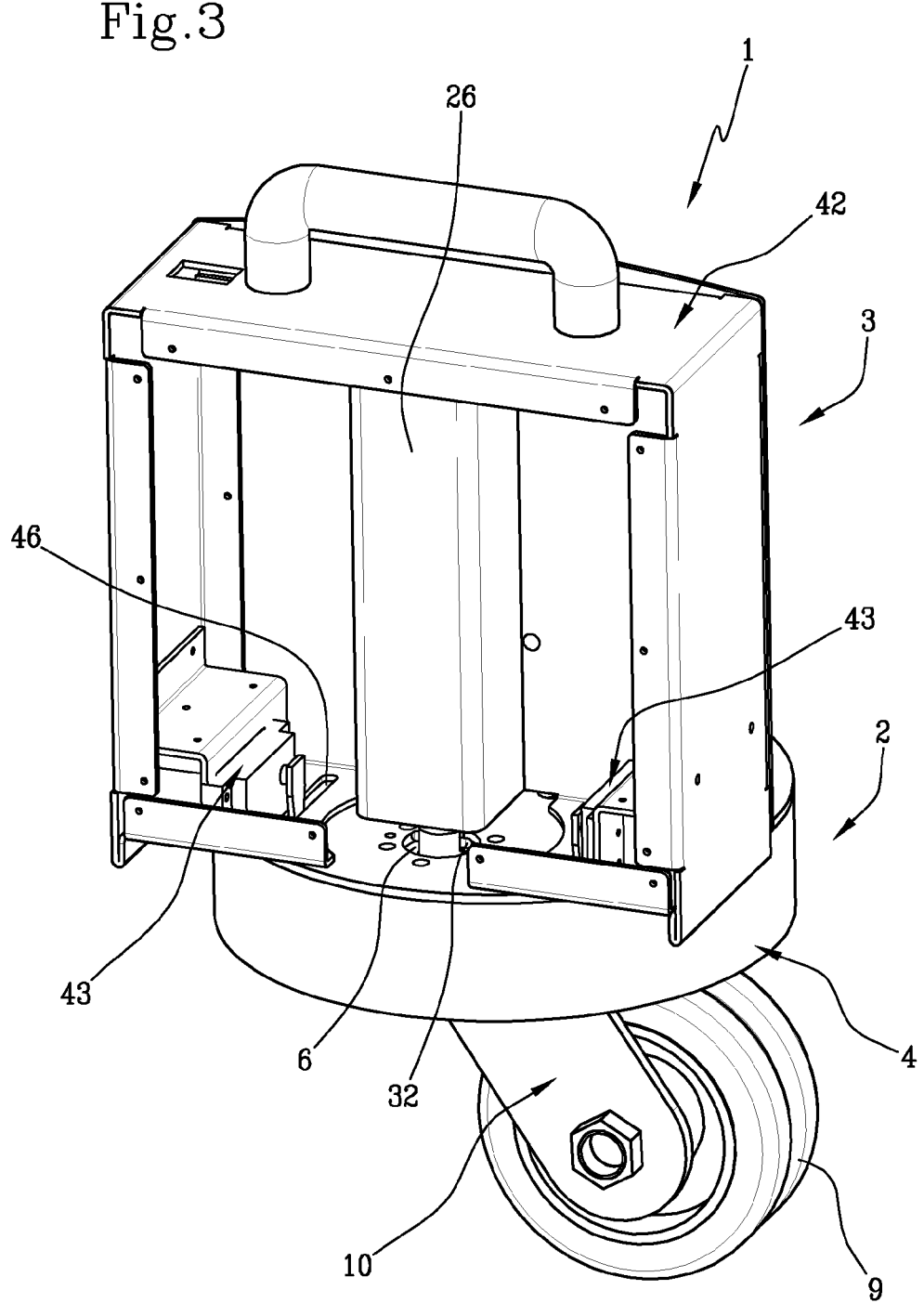
FIGS. 3, 4, 5A and 6 are schematic perspective views according to different angles of the steering unit of FIG. 1 in an assembled configuration.
Figure 4:
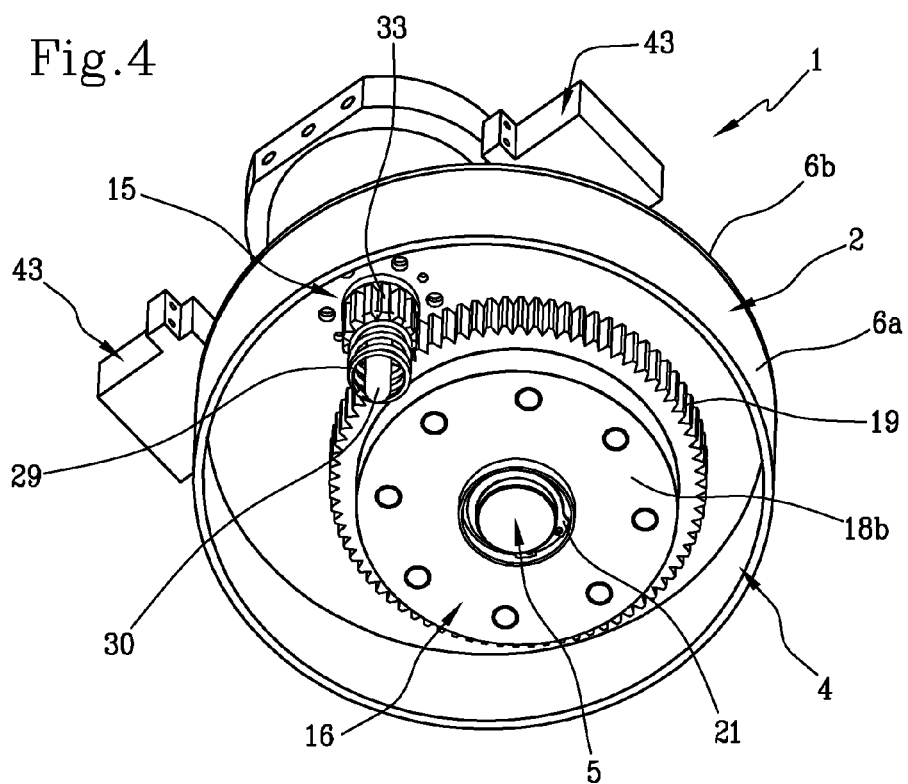
Figure 6:
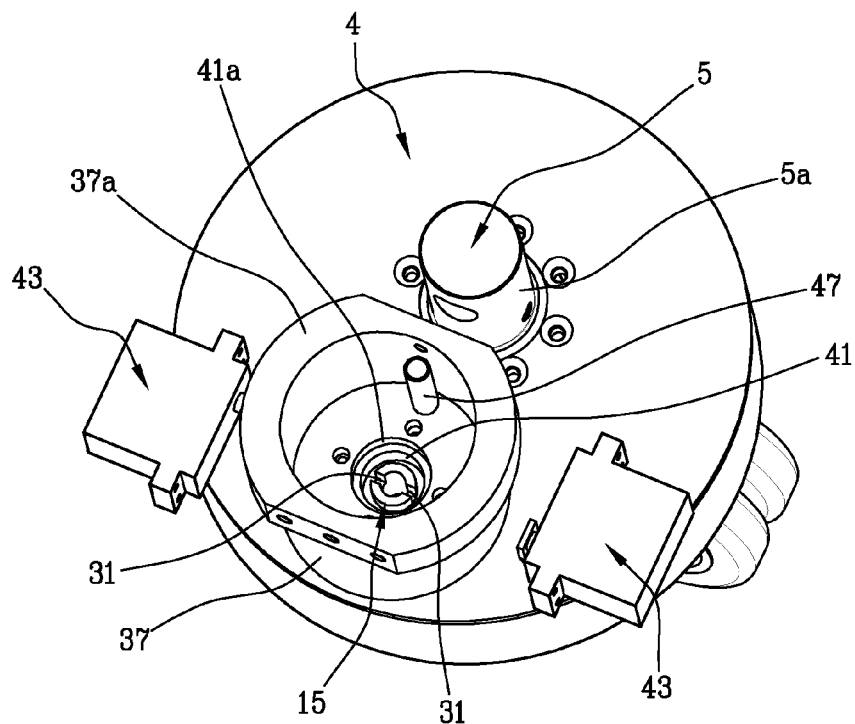
Figure 5A:
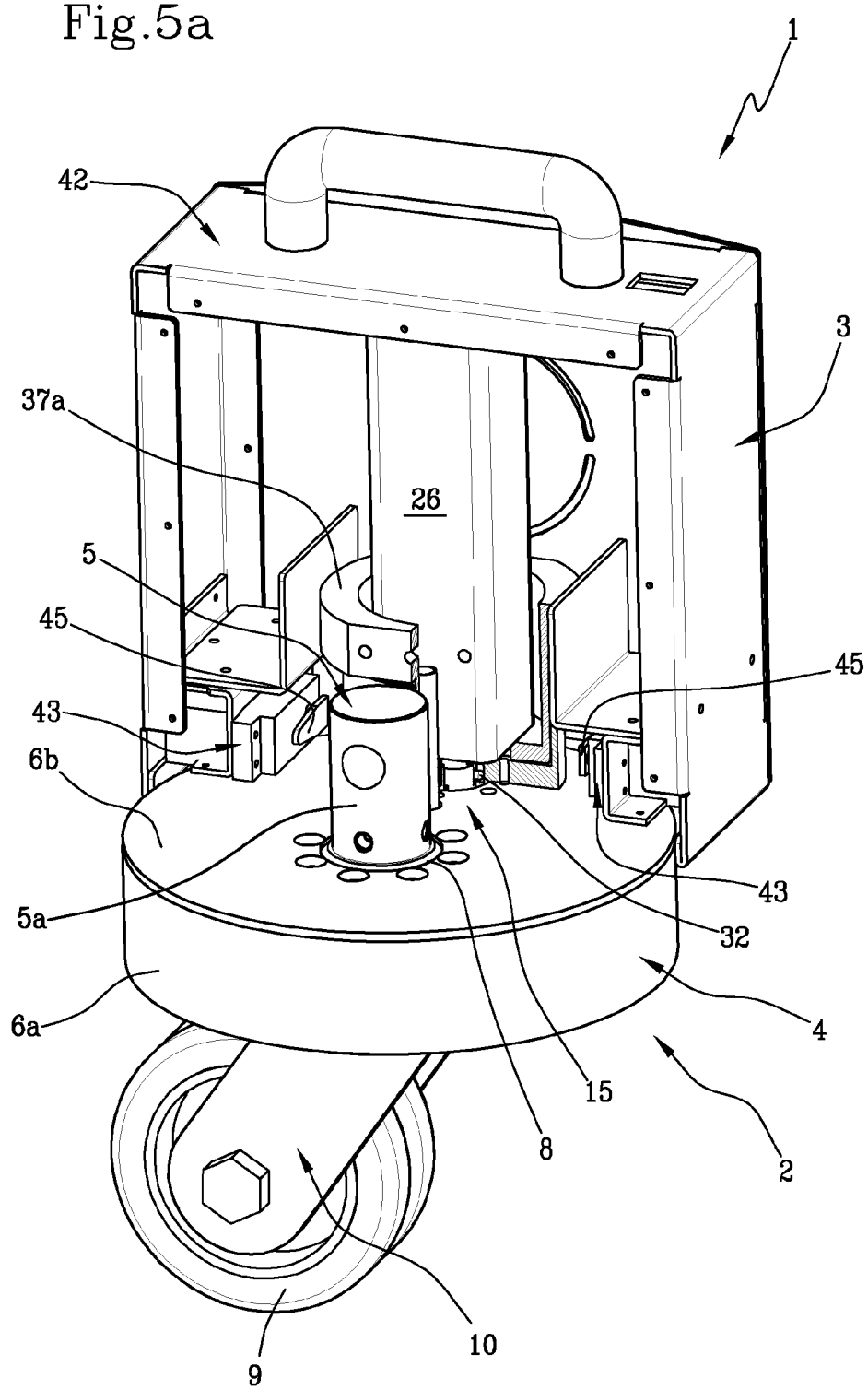
Figure 5B:
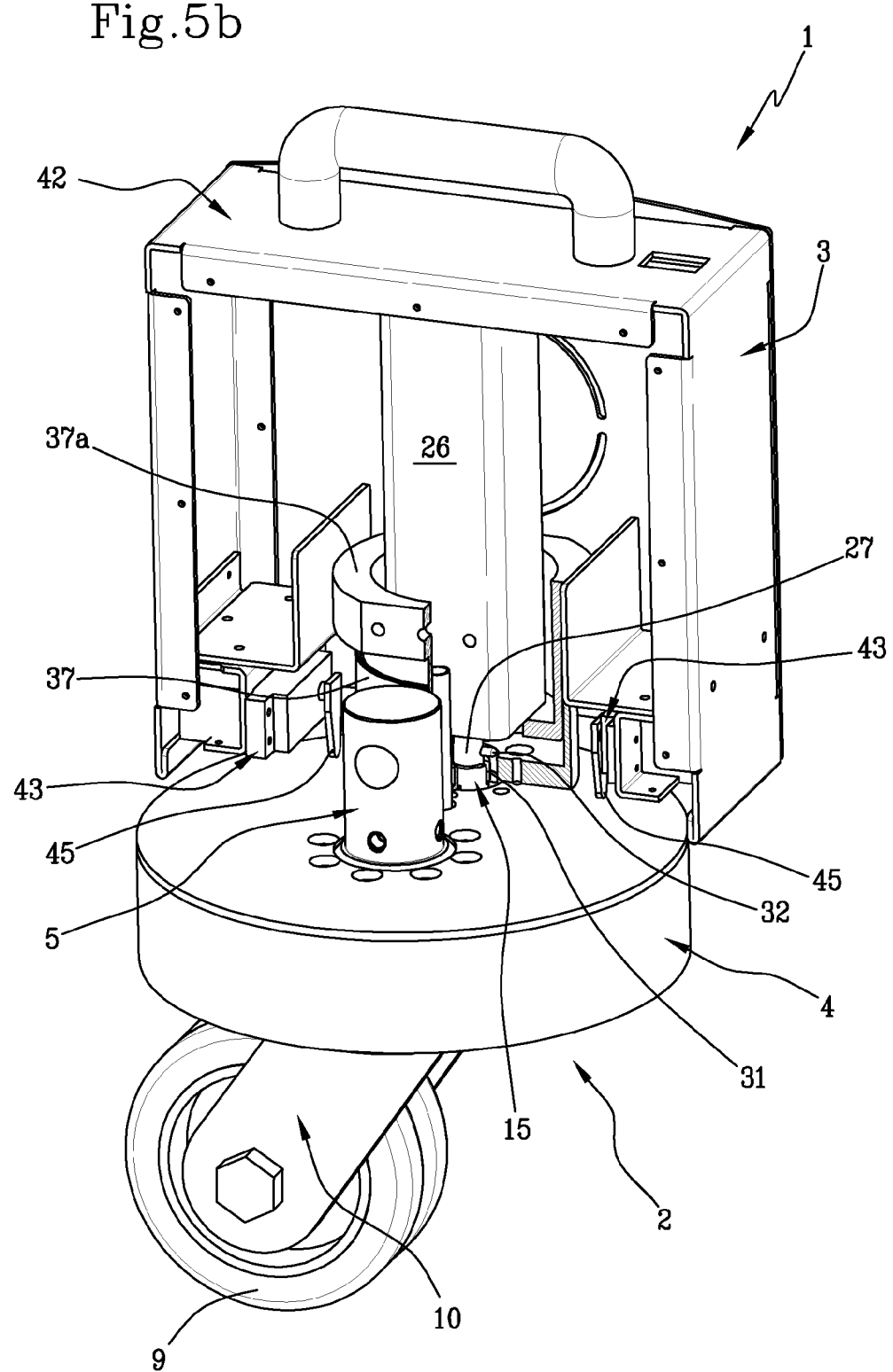
FIG. 5B is a schematic perspective view of the steering unit of FIG. 1 in a non-operating configuration.
Figure 5C:
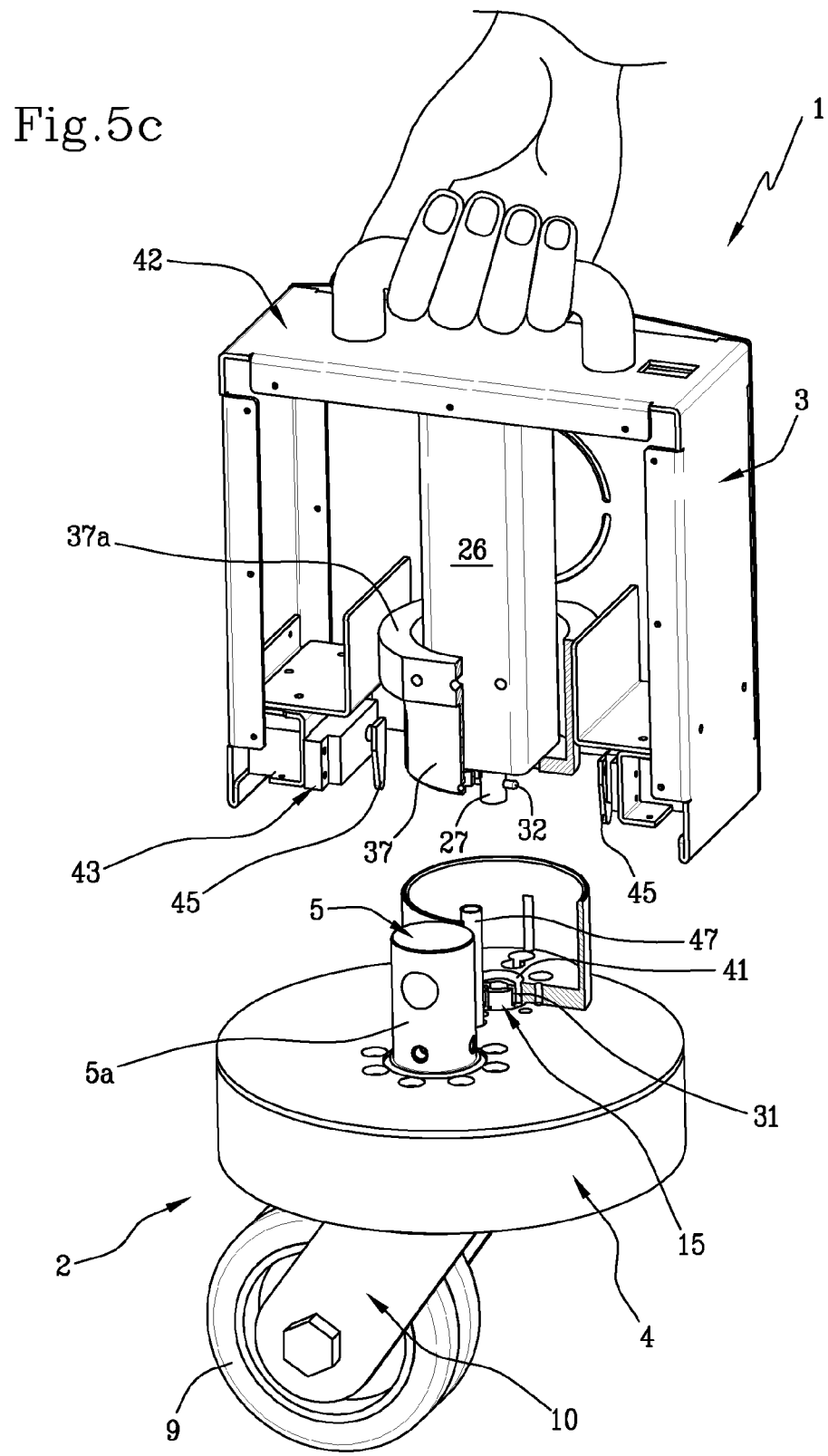
FIG. 5C is a schematic perspective view of the steering unit of FIG. 1 in a disassembled configuration.

FIGS. 1 to 6 shows a first possible embodiment of a steering unit 1 for conveying devices on wheels such as beds, stretchers or trolleys according to this invention.

The steering unit 1 comprises a wheel unit 2 and a motor unit 3.

The wheel unit 1 comprises a base structure 4 designed to be mounted on a conveying device on wheels.

According to a possible embodiment, the base structure 4 comprises a pin 5 designed to be inserted in a seat of a frame of the conveying device on wheels. More specifically, in the case of existing conveying devices, the pin 5 is configured to be inserted in the same seat which receives one of the wheels or wheel units with which the conveying device is originally provided, in such a way as to replace it.

In one possible embodiment, the base structure 4 forms an outer case which preferably comprises at least one access opening 6. According to a specific embodiment, for example illustrated in FIGS. 1 to 6, the outer case may be defined by a box-shaped element 7a, for example cylindrical in shape, closed above and/or below by respective lids (7b, 7c).

If there is the pin 5, the base structure 4 forms an outer case which preferably has at least one opening 8 for inserting the pin 5.

The wheel unit 2 also comprises a wheel 9 mounted on a supporting element 10 so as to rotate about a relative axis of rotation 11 to roll on the surface on which the conveying device rests.

Preferably, the wheel 9 is a double wheel; advantageously, this reduces the friction during rotation and allows an optimum movement of the device to which the unit 1 is fixed; more specifically, tests have revealed an improvement in the disengagement of the motor 26, that is to say, a facilitation in the setting up of the disengagement means in their configuration for uncoupling the motor 26 from the wheel 9.

The supporting element 10 is mounted on the base structure 4 in such a way as to rotate about an orientation axis 12 positioned transversely to the axis of rotation 11 of the wheel 9 to allow the orientation of the wheel and its axis of rotation 11 about the orientation axis. The positioning of the supporting element 10 relative to the base structure 4 makes the wheel 9 pivot about the orientation axis 12.

According to a possible embodiment, for example illustrated in the drawings, the supporting element 10 comprises two forks 10a integral with a plate 10b supporting a rotating pin 13 of the wheel 9. In addition to the above, there may also be, if necessary, a spacer 14.

The wheel unit 2 also comprises transmission means operatively interposed between the motor unit 3 and the wheel 9, in particular the supporting element 10, and configured in such a way as to transmit to the wheel 9 a motion of orientation about the orientation axis 12. Preferably, the transmission means are mounted on the base structure 4. Still more preferably, the base structure defines an outer case enclosing at least partly the transmission means.

In general terms, the transmission means comprise at least an inlet unit, preferably an inlet shaft 15, and an outlet shaft 16.

The outlet shaft 16 is integral with the supporting element 10 and defines the orientation axis 12. In other words, the outlet shaft 16 extends along its own axis which, in an assembled configuration of the wheel, coincides with the orientation axis 12. More specifically, the transmission means are configured for transforming an inlet motion of the inlet unit 15 into an outlet rotation of the outlet shaft 16 about the orientation axis 12.

According to a possible embodiment, for example illustrated in FIGS. 1 to 6, the outlet shaft 16 is hollow. In other words, the outlet shaft 16 has, along the orientation axis 12, a through cavity 17 which extends between opposite transversal surfaces 18a, 18b relative to the orientation axis 12 of the outlet shaft.

According to a possible embodiment, the outlet shaft 16 comprises a crown 19 keyed to the shaft or preferably made as one piece at a radially external portion of the outlet shaft.

Preferably, the outlet shaft 16 is mounted on the base structure 4 in such a way as to rotate about the orientation axis 12. More specifically, there may be a bearing 20 interposed between the base structure 4 and the outlet shaft 16. If there is a hollow outlet shaft, for example illustrated in FIGS. 1 to 6, the bearing 20 is preferably housed inside the through cavity 17.

According to a possible embodiment wherein there is the pin 5, the pin may be positioned coaxial with the outlet shaft 16 and, therefore, with the orientation axis 12.

According to a possible embodiment wherein there is the pin 5, the outlet shaft 16 may be fitted on the pin 5, preferably coaxial with it, in such a way as to rotate about the orientation axis.

According to a possible embodiment wherein there is the pin 5 and the outlet shaft 16 is hollow, the pin 5 may comprise a first axial portion 5a designed to be inserted in a seat of a frame of the conveying device on wheels and a second axial portion 5b on which the outlet shaft 16 can be inserted axially in such a way as to rotate about the orientation axis 12. Preferably, the first and second axial portions are coaxial with each other.

According to a possible embodiment, for example illustrated in the drawings, the first axial portion 5a and the second axial portion 5b are separated by a flange 5c for fixing the pin 5 on the base 7b of the base structure. If the base structure 4 forms an outer case, in the insertion of the pin 5 in the opening 8 for inserting, the first axial portion 5a protrudes outside the base structure whilst the second axial portion 5b is positioned inside it. The outlet shaft 16 is inserted axially on the second axial portion 5b for example by interposing the bearing 20 and it is locked axially on the pin 5 for example by means of a circlip 21 (Seeger ring). The supporting element 10 is integral with the transversal surface 18b of the outlet shaft for example by means of threaded elements, not illustrated.

According to a possible embodiment, for example illustrated in detail in FIG. 2, a transversal surface 18a of the outlet shaft, in particular of the crown 19, comprises an annular reference zone 22 positioned with its axis coinciding with the orientation axis 12. The annular reference zone 22 comprises at least a first sector 23 and a second sector 24 positioned at different heights to each other. Each height is measured parallel to the orientation axis 12. Preferably, the first sector 23 has angular extension α relative to the orientation axis 12 less than the angular extension of the second sector 24. More specifically, the angular extension α of the first sector 23 is preferably designed to define a predetermined angular position of the wheel 9 and of its axis of rotation 11 relative to the orientation axis 12. In detail, the first sector 23 may comprise a rib radial relative to the orientation axis which rises from the annular reference surface 22 (and, preferably, it is at the same level as the transversal surface 18a of the crown).

According to a possible embodiment, for example illustrated in detail in FIG. 2, the second sector 24 comprises at least two sub-sectors 24a, 24b positioned at different heights to each other and relative to the first sector 23. The heights are measured parallel to the orientation axis 12. In other words, there is a first step 25a between the first sector 23 and a sub-sector 24a, a second step 25b between the first sector 23 and the other sub-sector 24b, and a third step 25c between the two sub-sectors 24a, 24b.

Preferably, the sub-sectors 24a, 24b have respective angular extensions β, θ equal to each other. If the angular extension α of the first sector 23 is designed to define a predetermined angular position of the wheel 9 and of its axis of rotation 11 relative to the orientation axis 12, the angular extension β, θ of the sub-sectors 24a, 24b is close to 180°.

The motor unit 3 comprises a motor 26 equipped with a transmission unit, preferably a transmission shaft 27, rotated by the motor. The motor unit with the motor and the transmission unit will be described in detail below.

With reference to the inlet unit, this comprises engagement means designed to engage it reversibly on the transmission unit of the motor unit 3. Similarly, there can be complementary engagement means of the transmission unit designed to operate in conjunction with the engagement means of the inlet unit for reversibly engaging the inlet unit on the transmission unit.

Preferably, the inlet unit is movable between an engagement position, designed to allow engagement on the transmission unit of the motor unit 3, and an idle position.

According to a possible embodiment, for example illustrated in FIGS. 1 to 6, the inlet unit comprises the inlet shaft 15 mounted in a rotary fashion on the supporting structure 4 about a respective inlet axis 28, preferably parallel to the orientation axis 12. More specifically, the inlet shaft 15 is movable along the respective inlet axis 28 between an engaged position, designed to allow the inlet shaft 15 to engage on the transmission shaft 27 of the motor unit 3, and an idle position (which is obtained by raising the motor relative to the wheel 9).

According to a possible embodiment, for example illustrated in FIGS. 1 to 6, there are pushing means acting on the inlet shaft 15 to hold it in an engaged position. Preferably, the pushing means are elastic means, for example a helical spring 29.

In this embodiment, the pushing means apply a pushing action on the inlet shaft 15, the pushing action keeping the inlet shaft 15 in contact with the transmission shaft 27 of the motor unit 3.

If, at the moment of coupling between transmission shaft 27 and inlet shaft 15, the relative angular position between inlet shaft 15 and transmission shaft 27 is such that a coupling between the two elements is not immediately defined, the relative rotation between inlet shaft 15 and transmission shaft 27 is such that the two shafts (15, 27) move to a position in which the coupling occurs (that is, the angular locking between the two shafts).

The pushing means, in this coupling position, make it possible to apply a pushing action (upwards) of the inlet shaft 15 which is such as to establish, quickly and easily, a coupling (locking the rotation) between the inlet shaft 15 and the transmission shaft 27.

More specifically, the inlet shaft 15 may comprise a rod 30 on which the helical spring 29 is inserted axially.

According to a possible embodiment, for example illustrated in FIGS. 1 to 6, the inlet shaft 15 comprises at least one axial groove 31 having at least one open end designed to receive at least one transversal pin 32 for coupling the transmission shaft 27. In the example illustrated there are two axial grooves 31 positioned diametrically opposite the inlet shaft 15 and two transversal coupling pins 32 positioned diametrically opposite the transmission shaft 27.

Preferably, the inlet shaft 15 comprises a pinion 33 meshing with the crown 19 of the outlet shaft 16.

If the base structure 4 comprises an outer case enclosing at least partly the transmission means and the case has at least one access opening 6, the access opening 6 is designed to receive the transmission unit, in particular the transmission shaft 27. The inlet unit, in particular the inlet shaft 15, is located at the access opening 6 in such a way as to render mutually accessible the engagement means and the complementary engagement means.

Preferably, the inlet shaft 15 is housed in a housing portion 34 of the base structure, for example a case, in such a way as to rotate about the inlet axis 28 and be able to translate along it between the engagement position and the position in which the transmission shaft 27 is positioned in contact with the inlet shaft 15 and there is no coupling with angular locking between the inlet shaft 15 and the transmission shaft 27. Advantageously, the elastic means, in particular the helical spring 29, are positioned between the housing portion 34 and the inlet shaft 15.

If the rod 30 is provided, the housing portion 34 has an opening 35 designed to receive and guide the rod both in the rotation about the inlet axis 28 and in the translation between the engagement position and the position in which the transmission shaft 27 is positioned in contact with the inlet shaft 15 and there is no coupling with angular locking between the inlet shaft 15 and the transmission shaft 27.

Preferably, the housing portion 34 has a window 36 to allow the pinion 33 and the crown 19 to engage with each other.

According to a possible embodiment, for example illustrated in FIGS. 1 to 6, the base structure 4 comprises a receiving element 37 defining a receiving seat 38 designed to receive at least a portion of the motor unit 3, for example a centring bushing 37a. Preferably, the receiving seat 38 comprises guide and centring elements, for example a plurality of ribs 39, designed to operate in conjunction with corresponding guide and centring elements, for example a plurality of grooves 40, of the centring bushing 37a of the motor unit 3.

According to a possible embodiment, for example illustrated in FIGS. 1 to 6, the motor 26 is at least partly inserted in the centring bushing 37a and the transmission unit, in particular the transmission shaft 27 protrudes from it through an access opening 41a. Similarly, the receiving element 37 has an access opening 41 designed to receive the transmission unit, in particular the transmission shaft 27. If the base structure defines an outer case enclosing at least partly the transmission means and the access opening 6 is provided, the access opening 6 of the receiving element 37 is preferably positioned at the access opening 6 of the base structure 4.

It should be noted that the receiving element 37 is locked angularly on the plate 7b, inserted inside the access opening 6 of the base structure 4.

The motor unit 3 may for example comprise a portable containment box 42 inside of which there is the motor 26. If there is the centring bushing 37a designed to be accepted in the receiving element 37, the centring bushing 37a is preferably integral with the containment box 42.

Preferably, the motor unit, and more specifically, the containment box 42, is designed to be mounted on the base structure 4 of the wheel unit 2 using fast and reversible coupling means. An example of the fast and reversible coupling means comprises a first assembly comprising the centring bushing 37a and the receiving element 37 and a second assembly comprising the axial grooves 31 and the transversal coupling pins 32.

According to a possible embodiment, for example illustrated in FIGS. 1 to 6, the motor unit 3 is mounted on the base structure 4 by means of coupling means configured in such a way as to define at least a first and second position at least of the motor 26, preferably of the entire motor unit 3, relative to the base structure 4 in a configuration of use of the steering unit 1. More specifically, the receiving element 37 associated with the base structure 4 defines the receiving seat 38 designed to receive the centring bushing 37a in at least a first and a second position relative to the base structure 4.

Preferably, the first position corresponds to the position in which the motor is engaged on the transmission means, in particular on the inlet unit and the second position corresponds to the position in which the motor is not engaged on the transmission means, in particular on the inlet unit. With reference to the accompanying drawings, the first position corresponds to a lowered position of the motor relative to the base structure and the second position corresponds to a raised position of the motor relative to the base structure.

According to a possible embodiment, for example illustrated in FIGS. 1 to 6, there are motor means 43 designed for moving at least the motor 26 (and, preferably, all the components forming part of the motor unit 3) at least between the first and the second position relative to the base structure 4 in a configuration of use of the steering unit 1. The return from the second position (raised) to the first position (lowered) may be obtained simply by the action of the weight force deactivating the motor means.

It should be noted that the motor 26 in the second position is kinematically disconnected from the inlet shaft 15, whilst in the first position it is connected (or designed to connect) with the inlet shaft 15.

Preferably, in the embodiment shown in FIGS. 1 to 6, the passage of the motor unit 3 from the second position to the first position occurs by the force of gravity, that is, the weight of the motor unit 3.

A control unit 44 may be operatively connected to the motor means 43 and programmed for operating following a command selected by an operator, for example, by a remote control.

According to a possible embodiment, for example illustrated in FIGS. 1 to 6, the motor means 43 may be operatively interposed between the containment box 42 and the base structure 4 for moving the containment box 42 at least between the first and the second position.

More specifically, the motor means 43 can comprise motor means 43 connected to a lever 45 rotating, by the action of the motor means, between a position wherein the containment box 42 (and, therefore, the motor 26) is raised relative to the base structure 4 (second position) and a position wherein the lowering of the containment box 42 (and therefore of the motor 26) is allowed relative to the base structure 4 (first position). If the motor means 43 are positioned inside the containment box 42, there may be at least one groove 46 made for example in a bottom of the containment box for allowing the passage of the lever 45 and its interaction with the base structure 4. Preferably, there are two motor means 43 each connected to a rotary lever 45 and positioned on symmetrical parts of the motor unit 3, in particular of the containment box 42, for example relative to the motor 26.

According to a possible embodiment, for example illustrated in FIGS. 1 to 6, a position sensor 47 may be positioned facing the annular reference zone 22 and designed for measuring the height. The position sensor 47 is preferably mounted in the motor unit 3, in particular in the containment box 42, if provided, and crosses a series of openings in such a way as to face the annular reference zone 22.

The control unit 44 may be operatively connected to the motor 26 and to a remote control. In this case, the control unit 44 is programmed to drive the motor 26 following a command selected by an operator and orient the wheel 9 relative to the orientation axis 12.

Advantageously, if the position sensor 47 is provided, this may be operatively connected to the control unit 44 to measure the angular orientation of the wheel 9 relative to the orientation axis 12 as a function of the height measured by the position sensor 47. More specifically, in the case of two or more sub-sectors 24a, 24b the control unit 44 is programmed for measuring the angular orientation of the wheel 9 relative to the orientation axis 12 as a function of the height measured by the position sensor 47 and controlling the motor 26 to achieve a predetermined orientation of the wheel 9, for example associated with the first sector 23 of the annular reference zone 22, preferably moving along the smaller angle.

The motor unit 3 may also comprises at least one battery pack 48, preferably two battery packs distributed symmetrically inside the motor unit 3.

In use the steering unit as described above allows the wheel 9 to be oriented relative to the orientation axis 12 to facilitate the execution of curves and, in general, the manual moving of the conveying device. The operator controls the orientation of the wheel 9 and the disengaging of the motor unit from the wheel unit, preferably using a remote control.

The remote control can—optionally—also comprises a control for the fast return of the wheel 9 to a predetermined position, for example corresponding to the first sector 23, or zero position wherein the wheel is oriented to allow the forward movement of the conveying device. This control also facilitate the completion of a curve both because the position of the wheel contributes to setting up the trajectory of the conveying device and because with the motor-driven rotation of the wheel there is a pushing force on the conveying device which reduces the pushing action which must be applied by the operator.

According to another aspect of the invention, the steering unit described above makes it possible to simplify the management of two or more conveying devices using a single motor unit 3 for a plurality of wheel units 2. An aspect of this invention relates to a method for managing a plurality of conveying devices on wheels such as beds, stretchers or trolleys comprising a plurality of wheel units 2 and a single motor unit 3 which can be coupled in a fast and reversible fashion to each wheel unit, for example having a portable containment box and fast and reversible coupling means; mounting at least one wheel unit 2 for each conveying device and coupling the motor unit 3 in a fast and reversible fashion selectively to each wheel unit 2 as a function of the conveying device to be used.

In other words, each user is provided with a portable motor unit 3 and the user associates it with a wheel unit 2 of the conveying device which must be pushed. After moving the conveying device, the user detaches the motor unit 3 from the wheel unit 2 and it can be used for a different conveying device.

With reference to the embodiment previously illustrated, the operator slidably inserts from above the centring bushing 37a in the receiving element 37 and, therefore, in the receiving seat 38. The transmission shaft 27 protrudes from the centring bushing 37a, inserts into the access opening 41 of the receiving element 37 and in the access opening 6 of the base structure 4 and enters into contact with the inlet shaft 15. If the transversal coupling pins 32 engage in the axial grooves 31 the motor unit is engaged on the transmission means of the wheel unit. Otherwise, the transmission shaft 27 pushes the inlet shaft 15 against the force applied by the helical spring 29 and when the motor 26 is operated it rotates relative to the inlet shaft 15 until the transversal coupling pins 32 engage in the axial grooves 31.

If it is necessary to release the wheel unit 2 from the motor unit 3 to make the wheel 9 completely idle and pivoted or in the case of failure of the motor, the user operates the motor means 43 by rotating the levers 45 and, in the embodiment illustrated in FIGS. 1 to 6, raising the containment box 42 together with the motor 26.

With reference to the embodiment illustrated in FIGS. 1 to 6, it should be noted that in the case of a fault:
  if the fault is related to the motor 26, it is possible to activate the motor means 43 to disconnect the motor 26 from the inlet shaft 15;
  if the fault is related to the motor 26 or to any other component (for example, the motor means 43, electronic unit 44, etc.) the operator can extract the containment box 42 from the base 4 in such a way as to disconnect the motor 26 from the inlet shaft 15.

Relative to the aspect of the invention described above, it is advantageous to provide a kit for managing a plurality of conveying devices on wheels such as beds, stretchers or trolleys comprising a plurality of wheel units 2 and a single motor unit which can be coupled in a fast and reversible fashion to each wheel unit 2.

According to another aspect of the invention, the steering unit described above makes it possible to adapt a plurality of conveying devices on wheels such as beds, stretchers or trolleys already in use.

An aspect of the invention relates to a method for adapting a plurality of conveying devices on wheels such as beds, stretchers or trolleys provided with a plurality of pivoting wheels, comprising preparing a plurality of wheel units 2 or steering units 1 and replacing at least one pivoting wheel of each conveying device with a wheel unit 2 or a steering unit 1.

Figure 7:
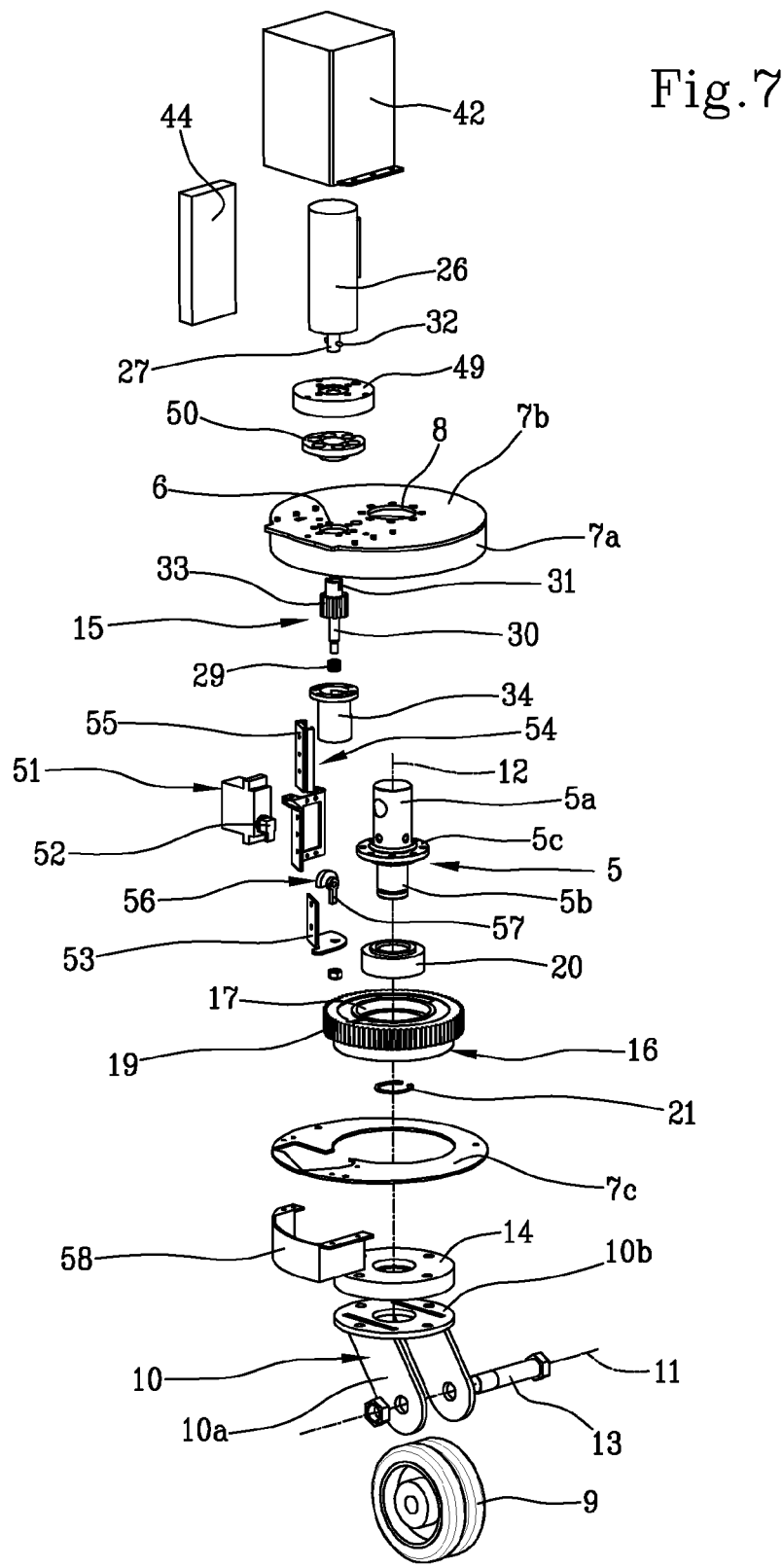
FIG. 7 is a schematic perspective view of separate parts of a steering unit according to a possible embodiment of this invention.
Figure 8:
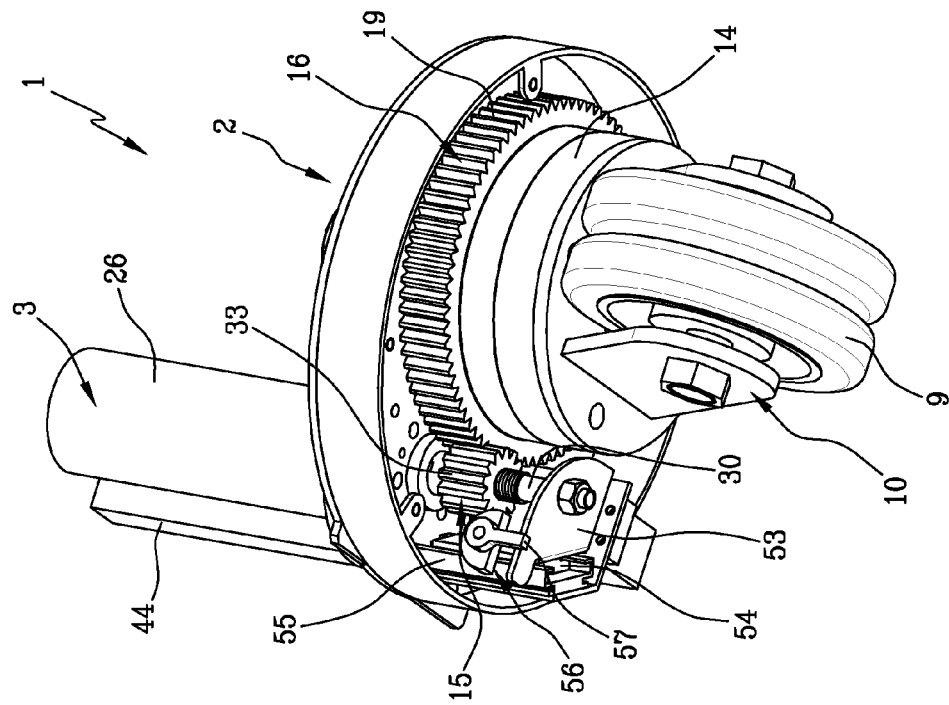
FIGS. 8 to 9 are schematic perspective views according to different angles of the steering unit of FIG. 7 in an assembled configuration.
Figure 9:
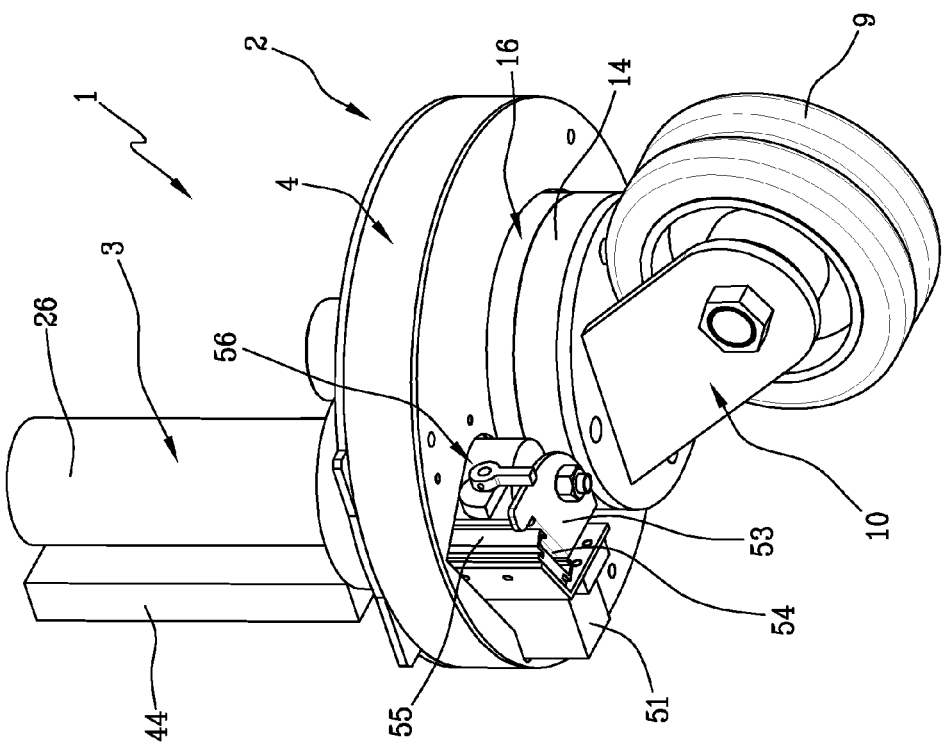

FIGS. 7 to 9 shows a second possible embodiment of a steering unit 1 for conveying devices on wheels such as beds, stretchers or trolleys according to this invention.

The steering unit 1 comprises a wheel unit 2 and a motor unit 3. The elements in common with the previous embodiment are denoted with the same reference numeral.

Relative to the preceding embodiment, the motor unit 3 is mounted on the base structure 4 using fixing means configured in such a way as to define a single position at least of the motor 26, preferably of the entire motor unit 3, relative to the base structure 4 in a configuration of use of the steering unit 1.

The containment box 42 is fixed to the base structure 4 for example by threaded fixing means. The drive shaft 27 is inserted in the access opening 6 of the base structure 4 without interposing the centring bushing and the receiving element. If necessary, there may be a motor flange 49 and/or a centring flange 50.

According to a possible embodiment, there may be disengagement means operatively associated with the inlet shaft 15 to move it from the engaged position to the idle position and keep it in the idle position.

For example, the disengagement means comprise an auxiliary motor 51 having a transmission unit 52 operatively connected to the inlet shaft 15. More specifically, a bracket 53 is fixed at one end of the pin 30 of the inlet shaft 15, projecting from the housing portion 34, in such a way that the transmission unit 52 driven by the auxiliary motor 51 exerts a force on the bracket 53 to translate (lower) the inlet shaft 15 from the engaged position to the idle position and keep it in the idle position, against the action of the helical spring 29. Preferably, there is a slide 54 mounted in a slidable fashion on a frame 55 integral with the base structure and integral both with the transmission unit 52 and the bracket 53.

Preferably, the control unit 44 is operatively connected to the disengagement means, for example to the auxiliary motor 51 and is programmed to operate the disengagement means following a command selected by an operator.

In addition or alternatively, the disengagement means comprise a cam device 56 operatively connected to the inlet shaft 15 by means of a bracket 53. The cam device 56 is preferably operated manually using a lever 57 mounted in a rotary fashion on a portion 58 of the base structure 4. According to a possible embodiment for example illustrated in the drawings, a bracket 53 is fixed at an end of the pin 30 of the inlet shaft 15, projecting from the housing portion 34, in such a way that the cam device 56 exerts a force on the bracket 53 to translate (lower) the inlet shaft 15 from the engaged position to the idle position and keep it in the idle position, against the action of the helical spring 29. If there is both the auxiliary motor 51 and the cam device 56, both can act on the same bracket 53.

According to another aspect of the invention, the steering unit described above also makes it possible to adapt a plurality of conveying devices on wheels such as beds, stretchers or trolleys already in use and it can therefore be used in a method for adapting a plurality of conveying devices on wheels such as beds, stretchers or trolleys provided with a plurality of pivoting wheels, comprising preparing a plurality of wheel units 2 or a steering unit and replacing at least one pivoting wheel of each conveying device with a wheel unit 2 or a steering unit 1. Preferably, each wheel unit is equipped with its own motor unit and constitutes a steering unit.

According to a possible embodiment not illustrated, the embodiment of FIGS. 1 to 6 may comprise motor means operatively interposed between the motor 26 and the containment box 42 of the motor unit or base structure 4 for moving the motor 26 at least between the first and the second position.

According to a possible embodiment not illustrated, the wheel unit may comprise a disk-shaped element integral with the outlet shaft 16 and having a surface transversal to the orientation axis 12 comprising the annular reference zone 22. In other words, in the examples illustrated, the disk-shaped element is represented by the crown 19 of the outlet shaft 16.

The invention claimed is:

1. A wheel unit for a conveying device, comprising:
   a base structure configured to be mounted on a conveying device on wheels and a wheel mounted on a supporting element to rotate about a wheel axis of rotation, wherein the supporting element is mounted on the base structure to rotate about an orientation axis positioned transversely to the wheel axis of rotation to allow an orientation of the wheel and the wheel axis of rotation about the orientation axis,
   a transmission device comprising an inlet unit for reversably engaging a transmission unit of a motor unit and an outlet shaft,
   wherein the outlet shaft is integral with the supporting element and defines the orientation axis, and
   wherein the transmission device is configured for transforming an inlet motion of the inlet unit into an outlet rotation of the outlet shaft about the orientation axis,
   wherein the inlet unit comprises an inlet shaft mounted in a rotary fashion on the base structure about an inlet axis parallel to the orientation axis,
   wherein the inlet shaft is movable along the inlet axis between an engaged position, allowing the inlet shaft to engage on the transmission unit of the motor unit, and an idle position, and further comprising a spring acting on the inlet shaft to keep the inlet shaft in the engaged position.

2. The wheel unit according to claim 1, comprising a disengagement device operatively associated with the inlet shaft to move the inlet shaft from the engaged position to the idle position and keep the inlet shaft in the idle position, wherein the disengagement device comprises an auxiliary motor having a transmission unit operatively connected with at least one chosen from the inlet shaft and a cam device, operated manually, operatively connected to the inlet shaft.

3. The wheel unit according to claim 1, comprising a disk-shaped element integral with the outlet shaft and having a surface transversal to the orientation axis comprising an annular reference zone, an axis of the annular reference zone coinciding with the orientation axis, and wherein the annular reference zone comprises a first sector and a second sector located at different heights relative to each other, the heights being measured parallel to the orientation axis, wherein the first sector has an angular extension relative to the orientation axis less than an angular extension of the second sector, the angular extension of the first sector defining a predetermined angular position of the wheel and the wheel axis of rotation relative to the orientation axis.

4. The wheel unit according to claim 3, wherein the second sector comprises two sub-sectors located at different heights relative to each other and relative to the first sector, the heights being measured parallel to the orientation axis, and wherein the sub-sectors have an equal angular extension.

5. A steering unit for a conveying device, comprising a wheel unit according to claim 3 and the motor unit, wherein the motor unit comprises a motor, wherein the transmission unit is attached to the motor and comprises an engagement device to operate in conjunction with the inlet unit for reversibly engaging the inlet unit on the transmission unit.

6. The steering unit according to claim 5, comprising a control unit operatively connected to a disengagement device, the control unit being programmed for operating the disengagement device following a command selected by an operator.

7. The steering unit according to claim 5, and further comprising a coupling device mounting the motor unit on the base structure, the coupling device configured to define a first position and a second position of the motor relative to the base structure in an operating configuration of the steering unit.

8. The steering unit according to claim 7, wherein the coupling device comprises a receiving element associated with the base structure and a bushing for centering the motor unit.

9. The steering unit according to claim 7, comprising:
a height adjustment motor configured for moving the motor between the first position and the second position relative to the base structure in an operating configuration of the steering unit, the height adjustment motor being operatively interposed between a containment box for containing the motor unit and the base structure for moving the containment box between the first position and the second position and
a control unit operatively connected to the height adjustment motor and programmed for operating the height adjustment motor following a command selected by an operator.

10. The steering unit according to claim 5, and further comprising a control unit operatively connected to the motor and to a remote control, the control unit being programmed for operating the motor following a command selected by an operator and orienting the wheel relative to the orientation axis.

11. The steering unit according to claim 10, and further comprising a position sensor facing the annular reference zone and configured for measuring the height of the annular reference zone, the position sensor being operatively connected to the control unit for measuring an angular orientation of the wheel relative to the orientation axis as a function of the height measured by the position sensor.

12. The steering unit according to claim 11, wherein the control unit is programmed for measuring the angular orientation of the wheel relative to the orientation axis as a function of the height measured by the position sensor and controlling the motor to achieve a predetermined orientation of the wheel.

13. The wheel unit according to claim 1, wherein the base structure comprises a pin configured to be inserted in a seat of a frame of the conveying device on wheels and wherein the outlet shaft is mounted on the pin to rotate about the orientation axis, the pin being coaxial with the outlet shaft.

14. The wheel unit according to claim 13, wherein the pin comprises a first axial portion configured to be inserted in the seat of the frame of the conveying device and a second axial portion and wherein the outlet shaft is hollow and inserted axially on the second axial portion of the pin to rotate about the orientation axis.

15. The wheel unit according to claim 1, wherein the base structure comprises a receiving element defining a receiving seat configured to receive a portion of the motor unit, the receiving seat comprising first guide and centering elements including a plurality of ribs, configured to operate in conjunction with corresponding second guide and centering elements including a plurality of grooves of the motor unit.

16. The wheel unit according to claim 15, wherein the base structure defines an outer case enclosing at least a portion of the transmission device, the case including an access opening configured to receive the transmission unit of the motor unit, and wherein the receiving element has an access opening configured to receive the transmission unit of the motor unit, the access opening of the receiving element being positioned at the access opening of the base structure.

17. A motor unit assembly for a wheel unit according to claim 1, comprising a portable containment box and the motor unit, the motor unit including a motor positioned inside the containment box, the motor attached to the transmission unit, the transmission unit comprising an engagement device for operating in conjunction with the inlet unit for reversibly engaging the inlet unit on the transmission unit, wherein the motor unit is mountable on the base structure with a reversible coupling device.

18. A kit for managing a plurality of conveying devices comprising a plurality of wheel units according to claim 17, wherein the motor unit can be selectively coupled in reversible fashion to each of the plurality of wheel units.

19. A method for managing a plurality of conveying devices comprising:
providing a plurality of wheel units, each wheel unit comprising:
a base structure configured to be mounted on a conveying device on wheels and a wheel mounted on a supporting element to rotate about a wheel axis of rotation, wherein the supporting element is mounted on the base structure to rotate about an orientation axis positioned transversely to the wheel axis of rotation to allow an orientation of the wheel and the wheel axis of rotation about the orientation axis,
a transmission device comprising an inlet unit for reversably engaging a transmission unit of a single motor unit and an outlet shaft,
wherein the outlet shaft is integral with the supporting element and defines the orientation axis, and
wherein the transmission device is configured for transforming an inlet motion of the inlet unit into an outlet rotation of the outlet shaft about the orientation axis,
wherein the inlet unit comprises an inlet shaft mounted in a rotary fashion on the base structure about an inlet axis parallel to the orientation axis,
wherein the inlet shaft is movable along the inlet axis between an engaged position, allowing the inlet shaft to engage on the transmission unit of the single motor unit, and an idle position, and further comprising a spring acting on the inlet shaft to keep the inlet shaft in the engaged position,
providing the single motor unit,
mounting a wheel unit for each conveying device,
coupling the single motor unit in a reversible fashion selectively to each of the plurality of wheel units according to the conveying device to be used.

20. A method for adapting a plurality of conveying devices wherein each conveying device comprises a plurality of pivoting wheels, the method comprising:
providing a plurality of wheel units, each wheel unit comprising:
a base structure configured to be mounted on a conveying device on wheels and a wheel mounted on a supporting element to rotate about a wheel axis of rotation, wherein the supporting element is mounted on the base structure to rotate about an orientation axis positioned transversely to the wheel axis of rotation to allow an orientation of the wheel and the wheel axis of rotation about the orientation axis,
a transmission device comprising an inlet unit for reversably engaging a transmission unit of a motor unit and an outlet shaft,
wherein the outlet shaft is integral with the supporting element and defines the orientation axis, and wherein the transmission device is configured for transforming an inlet motion of the inlet unit into an outlet rotation of the outlet shaft about the orientation axis, wherein the inlet unit comprises an inlet shaft mounted in a rotary fashion on the base structure about an inlet axis parallel to the orientation axis, wherein the inlet shaft is movable along the inlet axis between an engaged position, allowing the inlet shaft to engage on the transmission unit of the motor unit, and an idle position, and further comprising a spring acting on the inlet shaft to keep the inlet shaft in the engaged position, replacing a pivoting wheel of each conveying device with one of the plurality of wheel units.

21. A wheel unit for a conveying device, comprising:

a base structure configured to be mounted on a conveying device on wheels and a wheel mounted on a supporting element to rotate about a wheel axis of rotation, wherein the supporting element is mounted on the base structure to rotate about an orientation axis positioned transversely to the wheel axis of rotation to allow an orientation of the wheel and the wheel axis of rotation about the orientation axis, a transmission device comprising an inlet unit for reversably engaging a transmission unit of a motor unit and an outlet shaft, wherein the outlet shaft is integral with the supporting element and defines the orientation axis, and wherein the transmission device is configured for transforming an inlet motion of the inlet unit into an outlet rotation of the outlet shaft about the orientation axis, wherein the base structure comprises a receiving element defining a receiving seat configured to receive a portion of the motor unit, the receiving seat comprising first guide and centering elements including a plurality of ribs, configured to operate in conjunction with corresponding second guide and centering elements including a plurality of grooves of the motor unit, wherein the base structure defines an outer case enclosing at least a portion of the transmission device, the case including an access opening configured to receive the transmission unit of the motor unit, and wherein the receiving element has an access opening configured to receive the transmission unit of the motor unit, the access opening of the receiving element being positioned at the access opening of the base structure.

22. A steering unit for a conveying device, comprising:

a wheel unit, comprising:

a base structure configured to be mounted on a conveying device on wheels and a wheel mounted on a supporting element to rotate about a wheel axis of rotation, wherein the supporting element is mounted on the base structure to rotate about an orientation axis positioned transversely to the wheel axis of rotation to allow an orientation of the wheel and the wheel axis of rotation about the orientation axis, a transmission device comprising an inlet unit for reversably engaging a transmission unit of a motor unit and an outlet shaft, wherein the outlet shaft is integral with the supporting element and defines the orientation axis, and wherein the transmission device is configured for transforming an inlet motion of the inlet unit into an outlet rotation of the outlet shaft about the orientation axis, wherein the inlet unit comprises an inlet shaft mounted in a rotary fashion on the base structure about an inlet axis parallel to the orientation axis, wherein the inlet shaft is movable along the inlet axis between an engaged position, allowing the inlet shaft to engage on the transmission unit of the motor unit, and an idle position, and further comprising a spring acting on the inlet shaft to keep the inlet shaft in the engaged position, the motor unit including a motor and a transmission unit attached to the motor, the transmission unit including an engagement device to operate in conjunction with the inlet unit for reversibly engaging the inlet unit on the transmission unit.

* * * * *